United States Patent
Oueslati et al.

(10) Patent No.: US 7,191,250 B1
(45) Date of Patent: Mar. 13, 2007

(54) COMMUNICATION PROTOCOL FOR WIRELESS DATA EXCHANGE VIA A PACKET TRANSPORT BASED SYSTEM

(75) Inventors: Hatem Oueslati, Palavas (FR); Ludovic Ferrandis, Montpellier (FR)

(73) Assignee: Palmsource, Inc., Sunnyvale, CA (US)

( * ) Notice: Subject to any disclaimer, the term of this patent is extended or adjusted under 35 U.S.C. 154(b) by 550 days.

(21) Appl. No.: 09/811,994

(22) Filed: Mar. 19, 2001

(51) Int. Cl.
*G06F 15/16* (2006.01)
*G06F 15/173* (2006.01)

(52) U.S. Cl. .................. 709/245; 709/203; 709/223

(58) Field of Classification Search ............. 709/212, 709/208, 220, 221, 223, 203, 245
See application file for complete search history.

(56) References Cited

U.S. PATENT DOCUMENTS

| | | | | |
|---|---|---|---|---|
| 4,493,021 A | * | 1/1985 | Agrawal et al. ............ 709/236 |
| 5,684,988 A | * | 11/1997 | Pitchaikani et al. ....... 707/104.1 |
| 6,181,694 B1 | * | 1/2001 | Pickett ......................... 370/353 |
| 6,519,635 B1 | * | 2/2003 | Champlin et al. ........... 709/223 |
| 6,651,101 B1 | * | 11/2003 | Gai et al. .................... 709/224 |
| 6,654,786 B1 | * | 11/2003 | Fox et al. .................... 709/203 |
| 6,665,725 B1 | * | 12/2003 | Dietz et al. ................ 709/230 |

* cited by examiner

*Primary Examiner*—Ario Etienne
(74) *Attorney, Agent, or Firm*—Berry & Associates P.C.

(57) ABSTRACT

A protocol for wireless data exchange may be used in conjunction with two or more portable computer systems. One of the portable computer systems may be a personal digital assistant (PDA) having an internal or an external wireless communication unit. The protocol can be used by a sending application residing on the portable computer system to transparently send a wireless message to a receiving computer system. The packet is then automatically routed to the proper destination application residing on the receiver utilizing a data type identifier. The data type identifier is used by the receiver, in conjunction with an application registry, to determine the proper destination application.

19 Claims, 15 Drawing Sheets

510

ENTER

APPLICATION GENERATES DATA TO BE SENT TO RECEIVER
515

APPLICATION FORWARDS DATA TO EXCHANGE MANAGER AND SPECIFIES THE TRANSPORT TO BE USED (E.G. SMS)
520

EXCHANGE MANAGER CALLS THE CORRESPONDING TRANSPORT LIBRARY WHICH ADDS THE PROTOCOL TOKEN AND DATA TYPE ID AND THE CATEGORY TYPE ID IN THE DATA
525

THE TRANSPORT LIBRARY SEGMENTS DATA IF NEEDED AND PASSES IT TO COMMUNICATION UNIT
530

COMMUNICATION UNIT, E.G., GSM, USES COMMUNICATION PROTOCOL, E.G., SMS, TO TRANSMIT DATA TO RECEIVER
535

RETURN

FIGURE 7

COMMUNICATION PROTOCOL FOR WIRELESS DATA EXCHANGE VIA A PACKET TRANSPORT BASED SYSTEM

BACKGROUND OF THE INVENTION

1. Field of the Invention

The present invention relates to the field of electronic communication. More specifically, embodiments of the present invention relate to a communication protocol for short messaging wireless communication.

2. Related Art

As the components required to build a computer system have reduced in size, new categories of electronic devices and computer systems have emerged. One of the new categories of computer systems is the "palmtop" computer system. A palmtop computer system is a computer that is small enough to be held in the hand of a user and can therefore be "palm-sized." Most palmtop computer systems are used to implement various Personal Information Management (PIM) applications such as an address book, a daily organizer (calendar, datebook, etc.) and electronic notepads, to name a few. Palmtop computers with PIM software have been know as Personal Digital Assistants (PDAs). Many PDAs have a small and flat display screen associated therewith.

User convenience and device value are very important factors for portable electronic devices. Typically, portable electronic devices are employed while the user is on the run, e.g., in business meetings, on business travel, personal travel, in a vehicle, on foot, etc. Because the user may be occupied or busy while using the portable electronic device, the number of user steps or user tasks required in order to access information from an electronic device (or to store information into the electronic device) is crucial for producing a commercially successful and useful product. That is, the more difficult it is to access data from an electronic device, the less likely the user will perform those tasks to obtain the information. Likewise, the easier information is to obtain, the more likely the portable electronic device will be used to obtain that information and the more likely the portable electronic device will become a part of the user's everyday activities.

Similarly, the more useful the device, the more the device will be used and acquired. The functionality of mobile wireless devices is undergoing a transition. Mobile devices are evolving from a single application device with dedicated specific purpose communication channel (for example, a cell phone or pager), to more general-purpose devices with more flexible data communication capabilities.

More specifically, wireless technology is advancing, both in the number of options that are available for providing connectivity, and in their flexibility to provide general purpose data communication. Different technologies such as GSM with Short Message Service (SMS), NBS (Narrow-Band Sockets), cellular technologies (e.g., CDMA, TDMA), LAN access technologies (e.g., IEEE 802.11, HomeRF) and PAN technologies (e.g., Bluetooth, IR), each address a different set of needs, and provide different set of potential services. Mobile devices are no longer also restricted to one communication channel. Modular mobile devices allow network interfaces to be attached, allowing for unlimited communications configurations. The SMS system allows short messages and/or other data to be wirelessly communicated between devices. Bluetooth technology allows a single mobile device to be simultaneously in access multiple piconets through a single interface.

Many different applications are currently being developed for portable computer systems in order to make use of the wireless communication features offered for these platforms. Some applications are designed for sending information between two or more portable computer systems. However, there do not exist today communication protocols designed for use on portable computer systems that can provide efficient communication between the devices.

What is desired is an efficient protocol to ensure that the proper application receive, or be notified of, desired data that was received by a device. The NBS standard mentioned above, from Nokia and Intel, is not fully appropriate for the needs of a portable computer system having limited computing resources. For instance, with NBS, if an application is to exchange its data wirelessly with another portable device, some registration needs to be done against an organization in order to obtain a unique identification for the type of data that is being exchanged. This is required for each of potentially many applications, thereby adding overhead and complexity to the communication system, which is not advantageous for a portable computer system having limited resources. Further, the NBS system requires user involvement which may interfere or may even frustrate the user's computing experience.

SUMMARY OF THE INVENTION

Accordingly, what is needed is a wireless communication protocol that can be used between two or more computer systems that is flexible, not complex, and that is transparent of the transport being used. What is further needed is an efficient communication protocol that can be used between two or more portable computer systems each having limited computing resources and narrow bandwidth communication capabilities. What is also needed is such a system that also allows a sending application (residing on one computer system) to send information to another application (residing on a different computer system) in such a way that the underlying protocol is transparent to the sending application. What is needed yet is such a system that is also transparent to the user. Embodiments of the present invention provide the above advantages and others not specifically mentioned above but described in the sections to follow.

A protocol is described herein for wireless data exchange via a packet transport based system. The protocol may be used in conjunction with two or more portable computer systems. One of the portable computer systems may be a personal digital assistant (PDA) having an internal wireless communication unit, e.g., a GSM radio using the Short Message Service (SMS). In an alternative embodiment, one or both of the computer systems may be a PDA connected to a wireless device having the GSM radio functionality therewithin, e.g., such as a cell phone connected to (e.g., via wired or wireless link) a PDA. The protocol can be used by a sending application residing on the portable computer system to transparently send a wireless message to a receiving computer system. The packet is then automatically routed to the proper destination application residing on the receiver. The protocol uses a special token identifier that is placed before a data type identifier. The data type identifier is used by the receiver, in conjunction with an application registry, to determine the proper destination application. The data type identifier can identify by extension, MIME type or by application creator, for instance. The flexible protocol offers application developers an opportunity to write wireless data exchanging applications in which the communication mechanism is transparent to the application. The protocol is transport-independent and compliant with current smart messaging devices (as an extension of NBS).

More specifically, an embodiment of the present invention includes a communication protocol comprising the steps of: a) a sending application resident on a first computer system selecting a transport mechanism and passing data to a first utility program resident on the first computer system; b) the first utility program, adding a token, a data type category identifier, and a data type identifier to the data to form an information packet and then, transparently to the sending application, using the transport mechanism to transmit the information packet to a second computer system; c) a second utility program, resident on the second computer system, locating the data type identifier in the information packet using the token; d) the second utility program indexing a relevant category of an application registry with the data type identifier to determine a destination application that is associated with the data type identifier, wherein the application registry comprises identifiers categorized into a plurality of different data type categories and wherein the data type category identifier of the information packet identifies the relevant category; and e) supplying the data packet to the destination application.

Embodiments include the communication protocol and wherein the first computer system and the second computer system are portable computer systems. Embodiments include the communication protocol and wherein the first computer system and the second computer system are each portable computer systems connected to a separate wireless communication device. Embodiments include the communication protocol and wherein the transport mechanism is substantially compliant with the Short Message Service (SMS) standard and wherein the transport mechanism includes the use of a GSM wireless communication device.

Embodiments include the communication protocol and wherein the plurality of data type categories comprise: an Extension category; a MIME type category and an Application Creator category and wherein said data type category identifier is a numeric value. Embodiments also include a communication system implemented in accordance with the communication protocol described above.

BRIEF DESCRIPTION OF THE DRAWINGS

FIG. 7 is a flow diagram indicating steps performed according to an embodiment of the communication protocol of the present invention at the sending computer system.

DETAILED DESCRIPTION OF THE INVENTION

Figure 1:
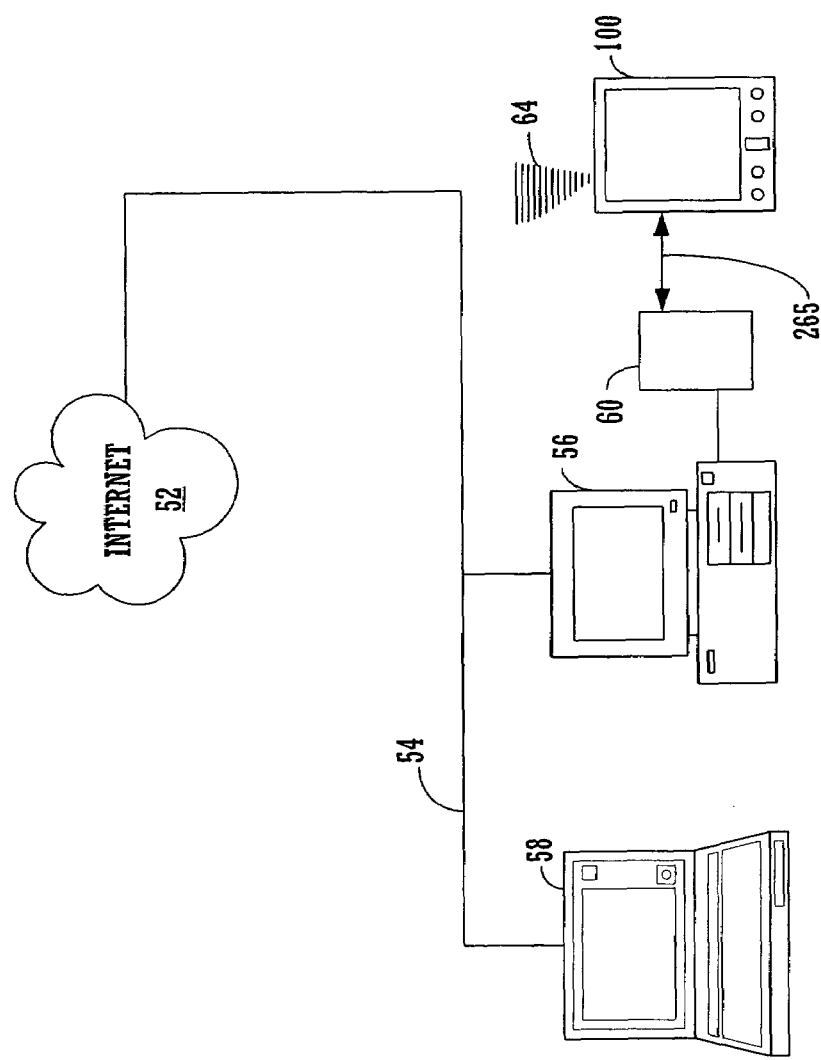
FIG. 1 is system illustration of a palmtop or "palm sized" computer system connected to other computer systems and the Internet via a cradle device or via a wireless communication link.

In the following detailed description of the present invention, a protocol for wireless data exchange via a packet transport based system, numerous specific details are set forth in order to provide a thorough understanding of the present invention. However, it will be recognized by one skilled in the art that the present invention may be practiced without these specific details or with equivalents thereof. In other instances, well known methods, procedures, components, and circuits have not been described in detail as not to unnecessarily obscure aspects of the present invention.

Notation and Nomenclature

Some portions of the detailed descriptions which follow (e.g., processes 510 and 600) are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "checking," "accessing" or "processing" or "computing" or "suspending" or "resuming" or "translating" or "calculating" or "determining" or "scrolling" or "displaying" or "recognizing" or "executing" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Exemplary Palmtop Computer System Platform

The communication protocol and processes of the present invention described herein may be practiced on any computer system but are applicable to portable computer systems, e.g., personal digital assistants (PDA). These devices include, for instance, intelligent cell phones, computerized pagers and portable computer systems. Although applicable across a wide variety of platforms and devices, embodiments of the present invention are described herein by example with respect to a portable or mobile computer system.

FIG. 1 illustrates an exemplary networked system 50 that can be used in conjunction with an embodiment of the present invention. System 50 is exemplary only and comprises a host computer system 56 which can either be a desktop unit as shown, or, alternatively, can be a laptop system 58. Optionally, one or more host computer systems can be used within system 50. Host computer systems 58 and 56 are shown connected to a communication bus 54, which in one embodiment can be a serial communication bus, but could be of any of a number of well known designs, e.g., a parallel bus, Ethernet Local Area Network (LAN), etc. Optionally, bus 54 (or a separate communication channel) can provide communication with the Internet 52 using a number of well known protocols.

Importantly, a communication link is also coupled to a cradle 60 (or cable dock) for receiving and initiating communication with an exemplary palmtop ("palm-sized") portable computer system 100 over line 265. Cradle 60 provides an electrical and mechanical communication interface between the computer system 100 for two way communications. In one embodiment, the communication link including cradle 60 and line 265 is a serial communication link or can be a USB link. Computer system 100 may also contain a wireless communication mechanism 64 for sending and receiving information to or from other devices. The wireless communication mechanism could be, for instance, a cellular phone (including a GSM, for instance), Bluetooth and/or wireless LAN (e.g., IEEE 802.11), or a combination of all, and these devices can be used to establish the communication link between the portable computer system 100 and the host computer system or between another portable computer system or server, etc.

Figure 2A:
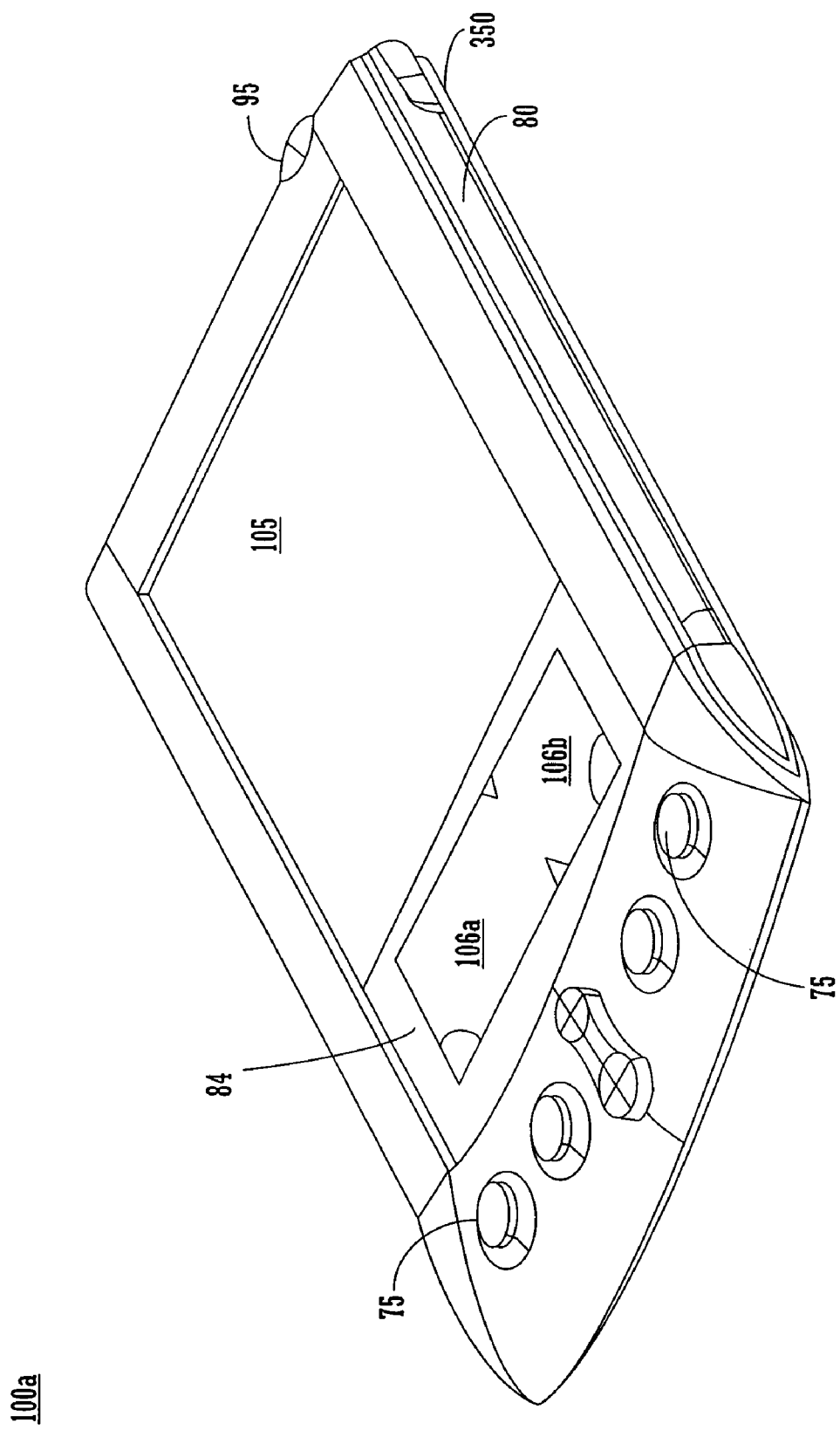
FIG. 2A is a top side perspective view of an exemplary portable computer system.

FIG. 2A is a perspective illustration of the top face 100a of one embodiment of a palmtop computer system. The top face 110a contains a display screen 105 surrounded by a bezel or cover. A removable stylus 80 is also shown. The display screen 105 contains a transparent touch screen (digitizer) able to register contact between the screen and the tip of the stylus 80. The stylus 80 can be of any material to make contact with the screen 105. As shown in FIG. 2A, the stylus 80 is inserted in a receiving slot or rail 350. Slot or rail 350 acts to hold the stylus when the computer system 100a is not in use. Slot or rail 350 may contain switching devices for automatically powering down and automatically power up computer system 100a based on the position of the stylus 80. The top face 100a also contains one or more dedicated and/or programmable buttons 75 for selecting information and causing the computer system to implement functions. Other buttons (icons) can be implemented within a silk screen layer material 84 on which regions 106a and 106b reside. An exemplary on/off button 95 is also shown.

FIG. 2A also illustrates a handwriting recognition pad or "digitizer" containing two regions 106a and 106b. Region 106a is for the drawing of alpha characters therein for automatic recognition (and generally not used for recognizing numeric characters) and region 106b is for the drawing of numeric characters therein for automatic recognition (and generally not used for recognizing numeric characters). The stylus 80 is used for stroking a character within one of the regions 106a and 106b. The stroke information is then fed to an internal processor for automatic character recognition. Once characters are recognized, they are typically displayed on the screen 105 for verification and/or modification.

Figure 4:
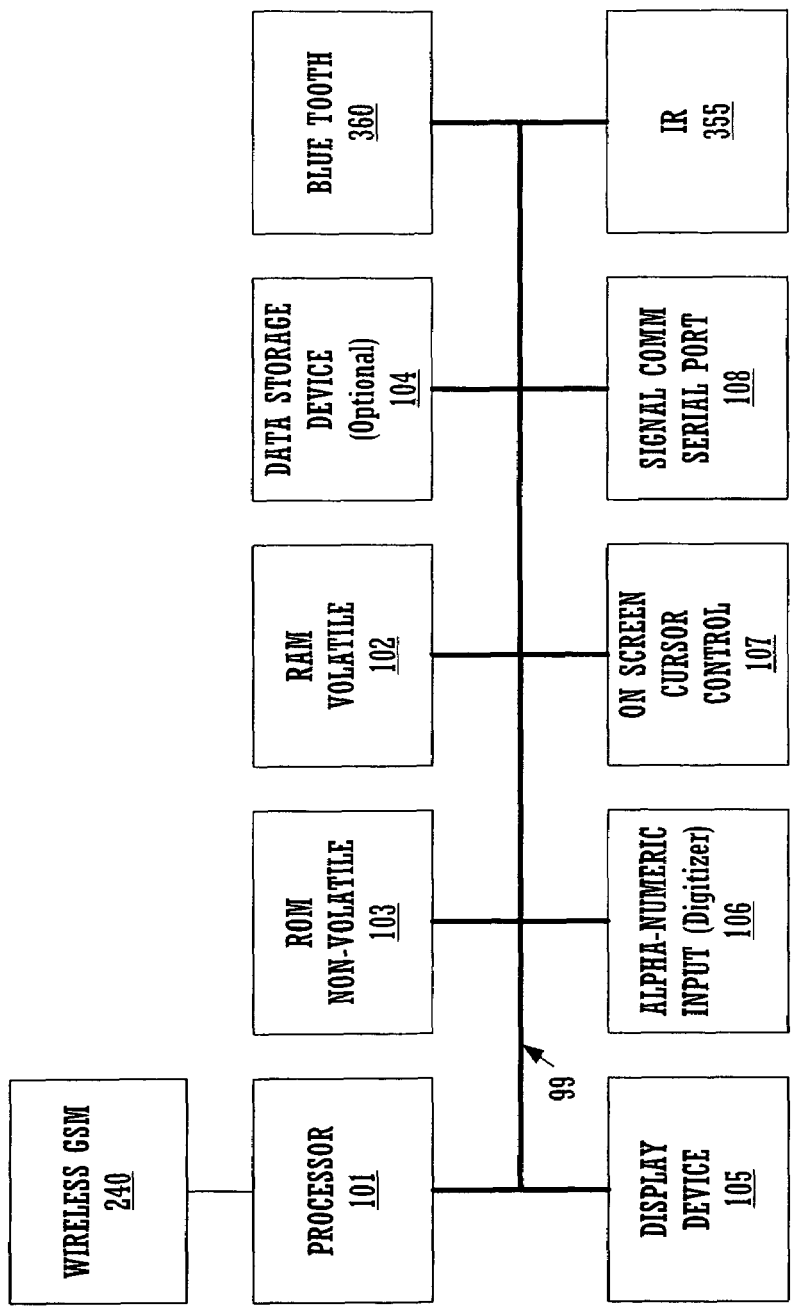
FIG. 4 is a logical block diagram of an exemplary portable computer system in accordance with an embodiment of the present invention.

The digitizer 160 records both the (x, y) coordinate value of the current location of the stylus and also simultaneously records the pressure that the stylus exerts on the face of the digitizer pad. The coordinate values (spatial information) and pressure data are then output on separate channels for sampling by the processor 101 (FIG. 4). In one implementation, there are roughly 256 different discrete levels of pressure that can be detected by the digitizer 106. Since the digitizer's channels are sampled serially by the processor, the stroke spatial data are sampled "pseudo" simultaneously with the associated pressure data. The sampled data is then stored in a memory by the processor 101 (FIG. 4) for later analysis.

Figure 2B:
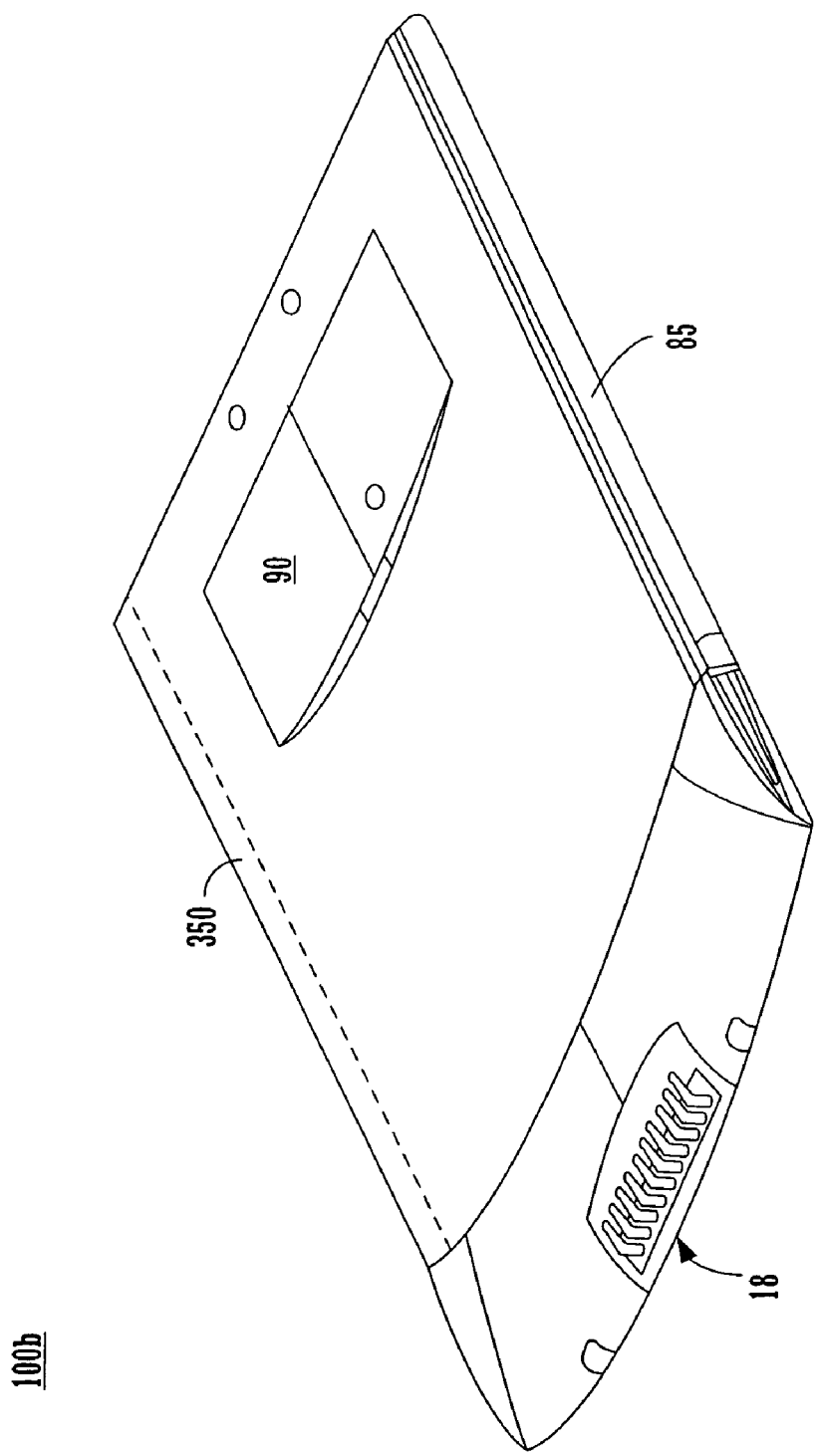
FIG. 2B is a bottom side perspective view of the exemplary portable computer system of FIG. 2A.

FIG. 2B illustrates the bottom side 100b of one embodiment of the palmtop computer system. An optional extendible antenna 85 is shown and also a battery storage compartment door 90 is shown. A communication interface 108 is also shown. In one embodiment of the present invention, the serial communication interface 108 is a serial communication port, but could also alternatively be of any of a number of well known communication standards and protocols, e.g., parallel, SCSI, Firewire (IEEE 1394), Ethernet, etc. In FIG. 2B is also shown the stylus receiving slot or rail 350.

Figure 2C:
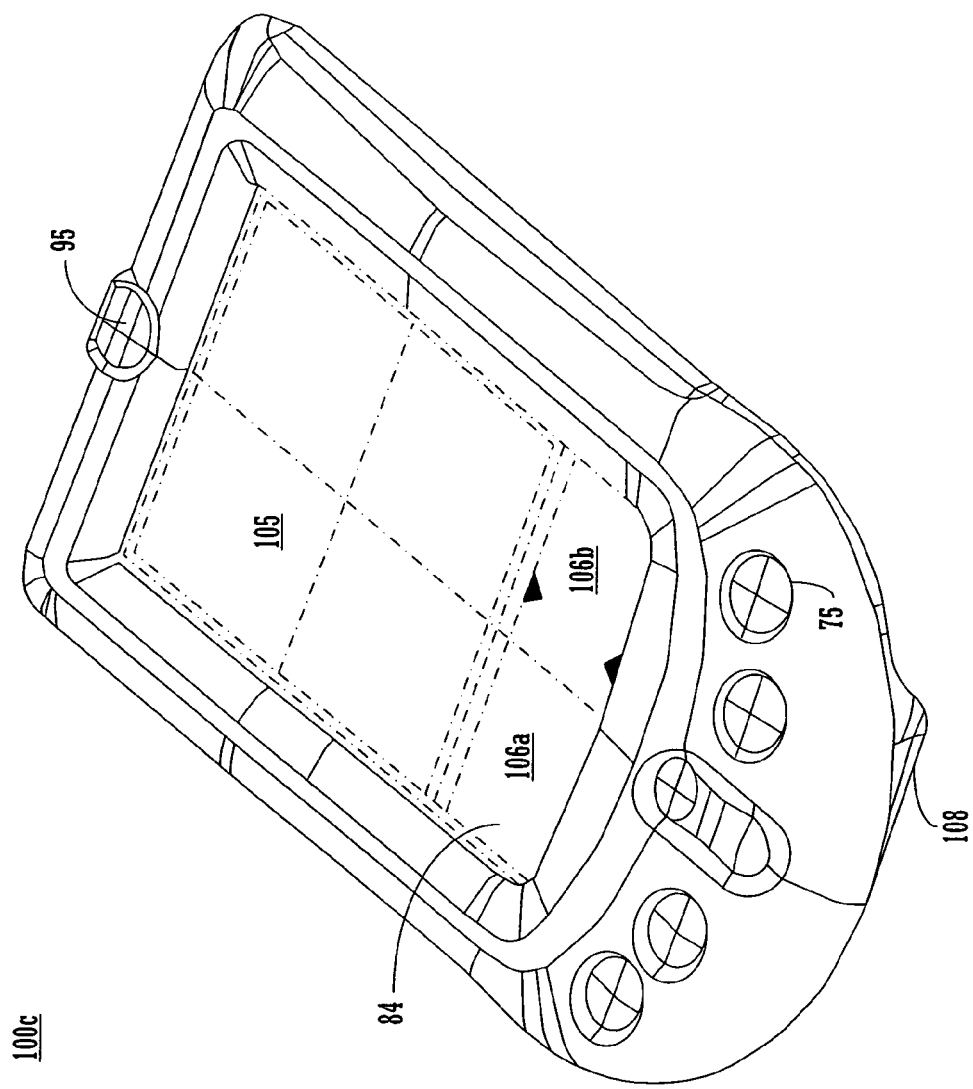
FIG. 2C is a perspective top view of another embodiment of the exemplary portable computer system.

FIG. 2C illustrates a front perspective view of another implementation 100c of the palmtop computer system. As shown, the flat central area is composed of a display screen area 105 and a thin silk screen layer material portion 84. Typically, the silk screen layer material portion 84 is opaque and may contain icons, buttons, images, etc., graphically printed thereon in addition to regions 106a and 106b. The display screen area 105 and portion 84 are disposed over a digitizer.

Figure 3:
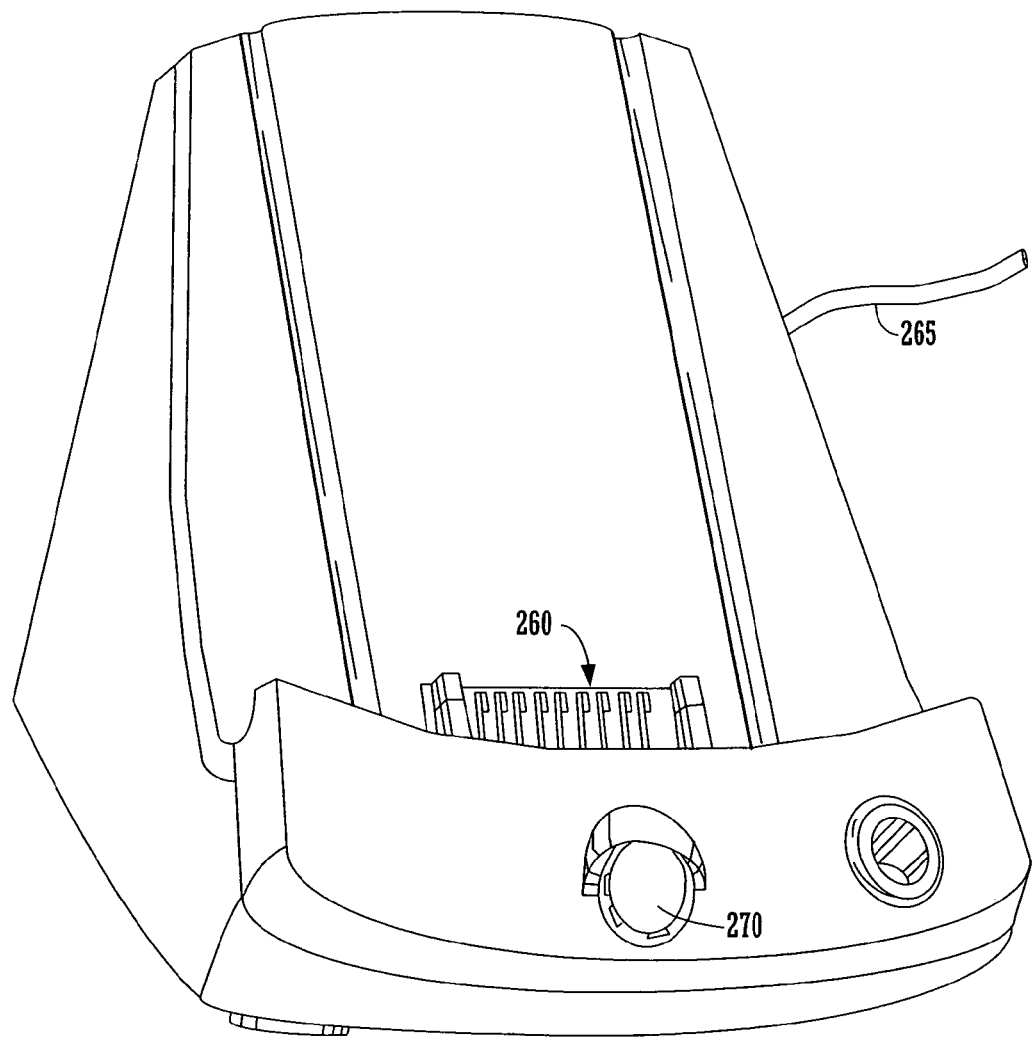
FIG. 3 is a perspective view of a cradle device for connecting a palmtop computer system to other systems via a communication interface.

FIG. 3 is a perspective illustration of one embodiment of the cradle 60 for receiving the palmtop computer system 100. In other embodiments, cradle 60 is not a stand-up device but is rather part of a cable connection between the palmtop computer system 100 and the desk top unit. Cradle 60 contains a mechanical and electrical interface 260 for interfacing with serial connection 108 (FIG. 2B) of computer system 100 when system 100 is slid into the cradle 60 in an upright position. Alternatively, a USB connection could be used. Once inserted, button 270 may be pressed to initiate two way communication between system 100 and other computer systems coupled to serial communication 265.

FIG. 4 illustrates circuitry of portable computer system 100. Computer system 100 includes an address/data bus 99 for communicating information, a central processor 101 coupled with the bus 99 for processing information and instructions, a volatile memory 102 (e.g., random access memory RAM) coupled with the bus 99 for storing information and instructions for the central processor 101 and a non-volatile memory 103 (e.g., read only memory ROM) coupled with the bus 99 for storing static information and instructions for the processor 101. Computer system 110 also includes an optional data storage device 104 (e.g., thin profile removable memory) coupled with the bus 99 for storing information and instructions. Device 104 can be removable. As described above, system 100 also contains a display device 105 coupled to the bus 99 for displaying information to the computer user.

Also included in computer system 100 of FIG. 4 is an alphanumeric input device 106 which in one implementation is a handwriting recognition pad ("digitizer") having regions 106a and 106b (FIG. 2A), for instance. Device 106 can communicate information (spatial data and pressure data) and command selections to the central processor 101.

System 110 also includes an optional cursor control or directing device 107 coupled to the bus for communicating user input information and command selections to the central processor 101. In one implementation, device 107 is a touch screen device (also a digitizer) incorporated with screen 105. Device 107 is capable of registering a position on the screen 105 where the stylus makes contact and the pressure of the contact. The digitizer can be implemented using well known devices, for instance, using the ADS-7846 device by Burr-Brown that provides separate channels for spatial stroke information and pressure information.

The display device 105 utilized with the computer system 100 may be a liquid crystal device, cathode ray tube (CRT), field emission device (FED, also called flat panel CRT) or other display device suitable for creating graphic images and alphanumeric characters recognizable to the user. Any of a number of display technologies can be used, e.g., LCD, FED, plasma, etc., for the flat panel display 105. In one embodiment, the display 105 is a flat panel multi-mode display capable of both monochrome and color display modes.

Signal communication device 108, also coupled to bus 99, can be a serial port (or USB port) for communicating with the cradle 60. In addition to device 108, wireless communication links can be established between the device 100 and a host computer system (or another portable computer system) using a Bluetooth wireless device 360, an infrared device 355, or a GSM radio device 240. Device 100 may also include a wireless modem device 240 and/or a wireless radio, e.g., a GSM wireless radio with supporting chipset. The wireless modem device 240 is coupled to communicate with the processor 101 but may not be directly coupled to port 108.

In one implementation, the Mobitex wireless communication system may be used to provide two way communication between system 100 and other networked computers and/or the Internet via a proxy server. In other embodiments, TCP protocol can be used or SMS can be used. System 100 of FIG. 4 may also contain batteries for providing electrical power. Replaceable cells or rechargeable batteries can be used. Well known electronics may be coupled to the battery to detect its energy level and this information can be sampled by the processor 101.

Wireless Communication Protocol of the Present Invention

Figure 5A:
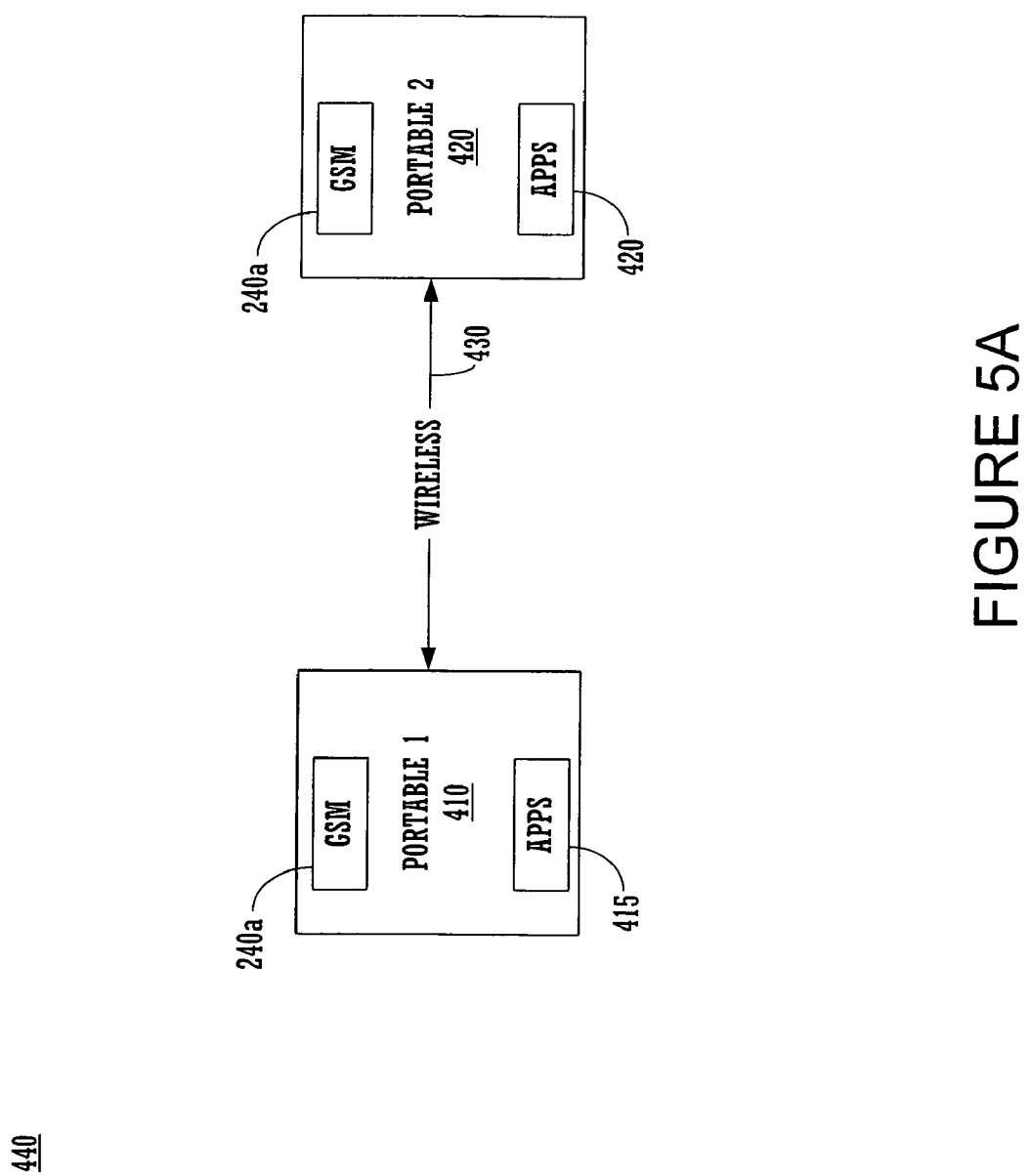
FIG. 5A illustrates a wireless communication system in accordance with the present invention including a sending computer system (with internal wireless device) and a receiving computer system (with internal wireless device).

FIG. 5A illustrates a communication system 440 in accordance with one embodiment of the present invention. System 440 includes a first computer system 410 and a second computer system 420 which are connected together via a wireless communication link 430. The computer systems could be of any type, but in one embodiment they are portable computer systems, e.g., hand-held computer systems. The wireless link 430 may be established using a number of different mechanisms, e.g., GSM wireless radio, Bluetooth, IR, wireless LAN, cellular, etc. The wireless link 430 may use any wireless communication protocol, but in one exemplary embodiment, the Short Message Service (SMS) communication protocol is used.

The first computer system 410 contains a GSM chipset 240a and a number of different application programs 415. Likewise, the second computer system 420 contains a GSM chipset 240b and a number of different application programs 425. In accordance with one example of the present invention, it is assumed that the first computer system 410 is the sender and the second computer system 420 is the receiver.

Figure 5B:
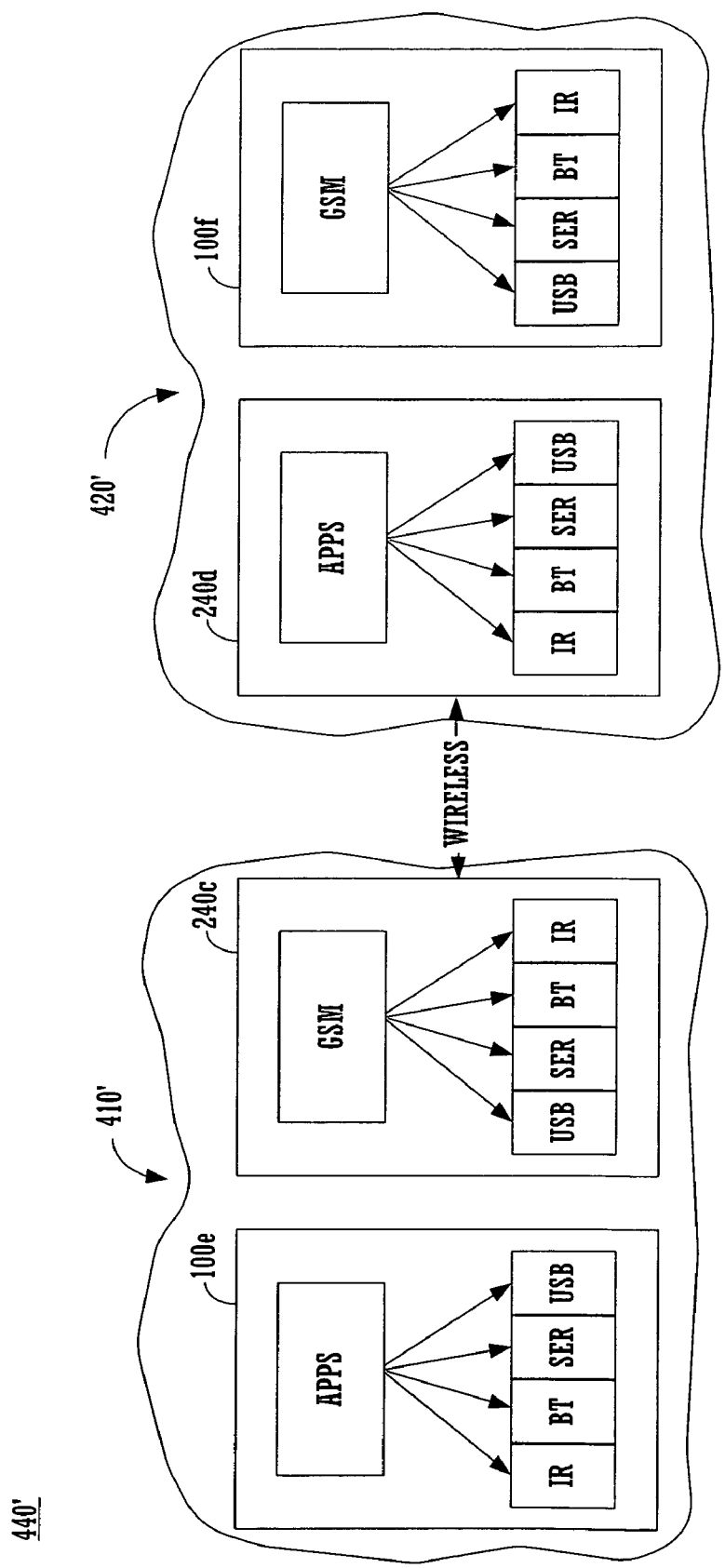
FIG. 5B illustrates a wireless communication system in accordance with the present invention including a sending computer system (with external but connected wireless device) and a receiving computer system (with external but connected wireless device).

FIG. 5B illustrates another embodiment of the present invention 440' where one or more of the computer systems utilize an external, but connected wireless communication device 240c, e.g., a cell or mobile phone. This is different from the one-piece solution described in FIG. 5A. Computer system 410' can be connected to the wireless device 240c using a number of different wired or wireless communication channels, e.g., by IR, or BT, or serial interface, or by a USB connection. It is appreciated that all aspects of the present invention discussed herein are equally applicable to the embodiments where the wireless device is placed internal to the PDA ("one-piece solution") or, alternatively, disposed external to the PDA ("two-piece solution") but connected to it via some wired or wireless communication channel. Therefore, the term "computer system" used herein anticipates both the one-piece and the two-piece systems. Further, the invention covers the embodiment where a one-piece system is communicating with a two-piece system and vice-versa.

Figure 6A:
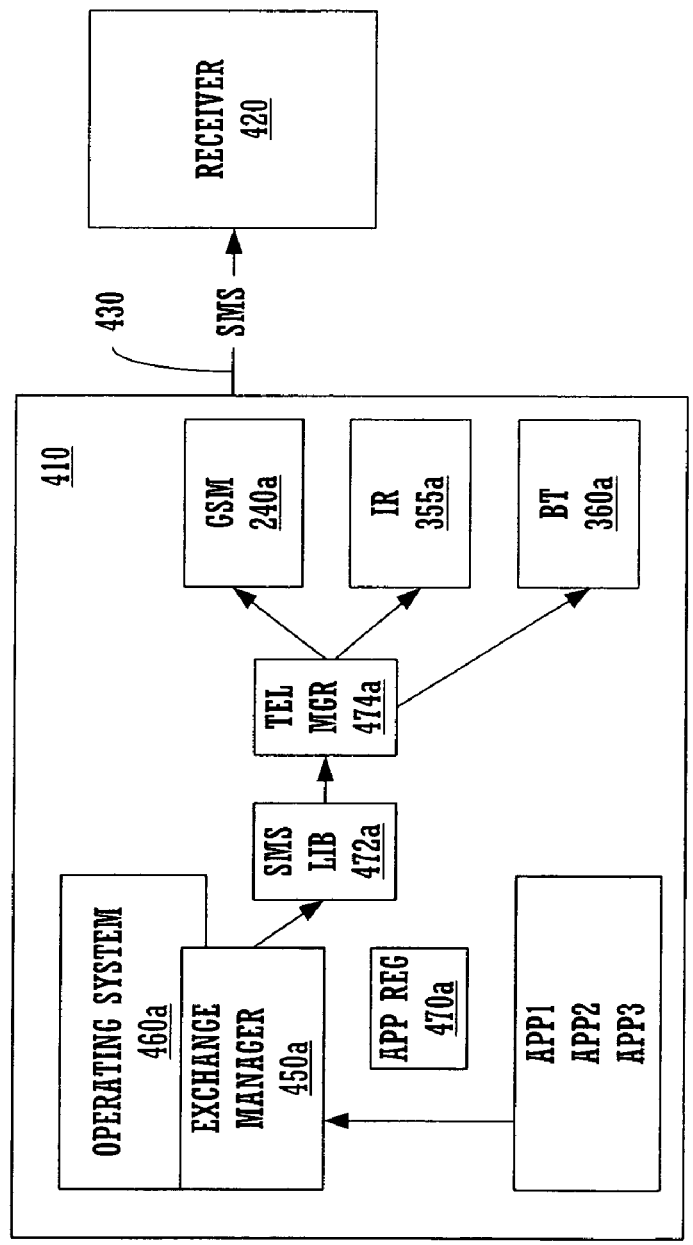
FIG. 6A illustrates components of one embodiment of the present invention situated at the sending computer system.
Figure 6B:
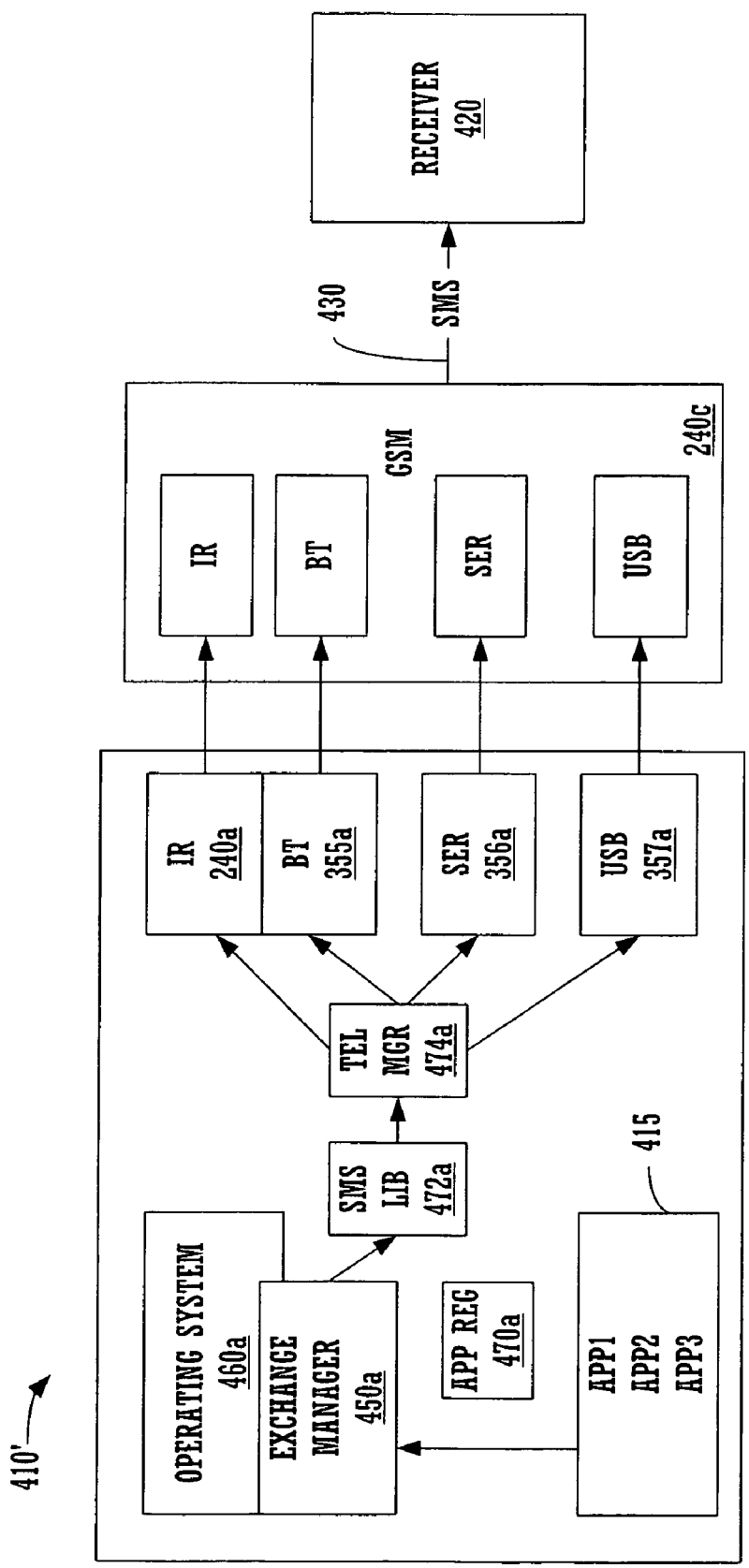
FIG. 6B illustrates components of one embodiment of the present invention situated at a sending computer system having an external but connected wireless device.

Sender Side. FIG. 6A illustrates components that are used in the sending phase of the communication protocol of the present invention and FIG. 7 is a flow diagram of steps implemented in the sending phase of the communication protocol. FIG. 6B illustrates an embodiment where the computer system includes an external wireless communication device, e.g., a mobile phone.

Reference is made to FIG. 6A and FIG. 7. Process 510 is implemented as computer code stored in memory and executed over a processor. According to the sending phase of the protocol, at step 515, an application program of the first computer system generates data to be sent to the second computer system. At step 520, the application forwards the data to a transport handler program which is a utility application and specifies which transport type to use, e.g., SMS. At step 525, the transport handler program 450a (FIG. 6A) of the first computer system calls the corresponding transport library which adds places certain protocol tags in the data to obtain an information packet. The information packet includes the data, a token, a data type identifier and a category type identifier. These items are described further below.

A number of different utility programs can be used for this purpose. In one embodiment of the present invention, an exchange manager 450a is used as the utility which is described in co-pending patent application Ser. No. 09/598,670, entitled "Data Exchange Between a Handheld Device and Another Computer System Using An Exchange Manager via Synchronization," by Peacock, filed Jun. 20, 2000, and assigned to the assignee of the present invention and hereby incorporated by reference. The exchange manager is also described in co-pending patent application Ser. No. 09/598,668, entitled "Information Exchange Between a Handheld Device and another Computer System Using An Exchange Manger and Uniform Resource Locator (URL) Strings," by Peacock, filed Jun. 20, 2000, and assigned to the assignee of the present invention and hereby incorporated by reference.

The exchange encoding scheme of the present invention first includes a token marking the beginning of the protocol header. The token can be any identifier, e.g., in one embodiment it is: "//EXG." The category type identifier is a number identifying the way to type the data content and is defined in one embodiment according to the following exemplary definitions:

"1": means that the data type is informed by its Extension;

"3": means that the data type is informed by its Application Creator; and

"2": means that the data type is informed by its Mime Type.

The Mime category type is a well known data type category and defines the type of content that is found in the data. Exemplary Mime types include: TEXT/PLAIN or TEXT for text files; TEXT/XML for XML specific pages; TEXT/HTML for Internet documents and web pages; /DIF for a data interchange file; IMAGE/JPEG for image or picture files and MPEG or VIDEO/MPEG for motion pictures, etc. The Extension category type is also a well known data type category and is a multiple character label associated with a datafile that also indicates its content type. For instance, ".vcf" indicates a v-card extension, ".exe" indicates an executable file extension, ".bin" indicates a binary formatted file extension, ".txt or .doc" indicates a text or word processing file extension, etc. Lastly, the Application Creator category type is a well known data type category and is a four byte identifier that uniquely identifies the name of the application program that created the data.

It is appreciated that the protocol of the present invention is open and many more data type categories can be defined, in addition to, the three exemplary designations given above. In one embodiment, the values "4–255" are reserved for category type identification.

Following the category type identifier, is a data type identifier that identifies more specifically the actual data type within the identified category. For instance, if the previous number was "1," it is the Extension category of the data type (for example "vcf" means a vCard extension). If the previous number was "2," it is the Mime type category of the data (for example "text/plain" means a Memo mime type). Lastly, if the previous number was "3" it is the target Application Creator (for example, 0x746F646F or 'todo' means that the receiving application for those data is the ToDo application). At last, the information packet may contain the ending of the protocol header: " "(a space), also called an ending token. In one embodiment, this ending token is mandatory.

The communication protocol of the present invention utilizes these protocol tags, described above, to identify an application on the receiving computer system that is to receive the data of the information packet. Using the protocol of the present invention, an application is provided with an easy way to perform wireless data exchanges between applications. For instance, the application need only put a very short header in front of its "real" data and the information packet is ready to go over the wireless transport.

The following illustrate some examples of the protocol tags in accordance with embodiments of the present invention. Assume the sending application wants to send vCards wirelessly (e.g., using the SMS standard as a transport) to another computer system. An exemplary vCard is shown below:
"BEGIN:VCARD\r\nVERSION:2.1\r\nN:Hatem; \r\nTEL;PREF;CELL:04995   24300\r\nUID: 7815169\r\nEND:VCARD\r\n".

The application merely places this short header in front of its payload data:
"//EXG1vcf".

The result is an information packet that looks like the following:
"//EXG1vcf
BEGIN:VCARD\r\nVERSION:2.   1\r\nN:Hatem; \r\nTEL;PREF;CELL:049952   4300\r\nUID: 7815169\r\nEND:VCARD\r\n".

The sending computer system uses SMS as the transport and it sends the information packet to the receiving computer which then receives the vCard wirelessly. Other applications, such as wireless games or wireless chat applications, or others, can be developed to use the exchange encoding scheme.

Returning to FIG. 7, at step 530, the transport library segments data if needed and passes it the proper communication unit to use to transfer the data. In this process, a telephony manager can be used.

In the example of FIG. 6A, the exchange manager may use a number of different transports, e.g., Bluetooth 360a, IR 355a or GSM 240a, or others at step 530 of FIG. 7. The selection of the transport used may be performed transparent to the sending application. Alternatively, the sending application may forward specific instructions for the exchange manager to use a particular communication mechanism. Assuming none is specified, the exchange manager will select the most appropriate transport available, in this case the GSM mechanism is selected and SMS is used. Once the selection is made, the exchange manager passes the information packet to the communication mechanism selected.

At step 535 of FIG. 7, the selected communication mechanism then uses the proper communication protocol to transmit the data packet wirelessly to the second computer system. It is appreciated that the communication protocol of the present invention can also be used "as is" directly into SMS contents and the only condition that the transport layer provides segmentation capabilities (which is actually the case with SMS). The communication protocol of the present invention is also independent from the transport. In one embodiment it is shown as being used over SMS, but it can run over any other packet transport having segmentation capabilities.

FIG. 6B is analogous to FIG. 6A, except the sending computer system 410' includes an externally coupled cell or mobile phone 240c. Also illustrated are the transport library 472a and the telephony manager 474a. The mobile phone 240c can be communicatively coupled to the portable computer via a number of different wired or wireless communication channels, including, for instance, BT, IR, USB or serial. Mobile device 240c then performs the wireless communication 430. It is appreciated that the process of FIG. 7 equally applies to system 410' of FIG. 6B.

Figure 8A:
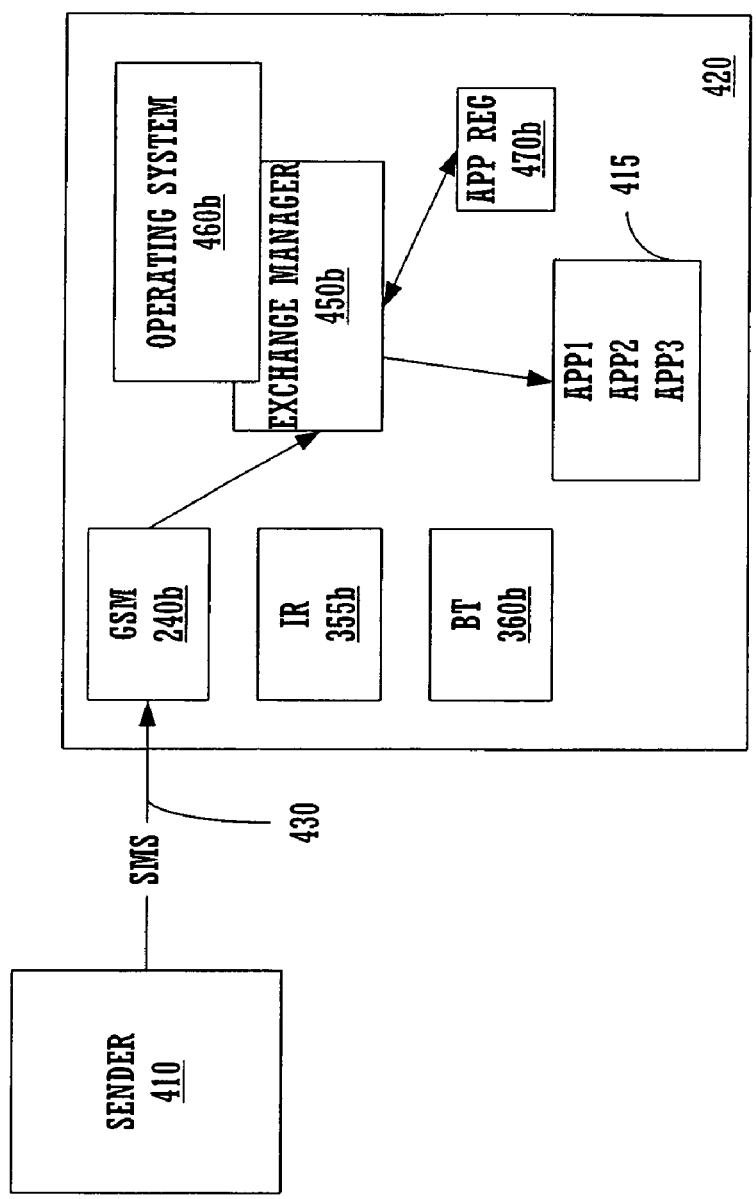
FIG. 8A illustrates components of one embodiment of the present invention situated at the receiving computer system.
Figure 8B:
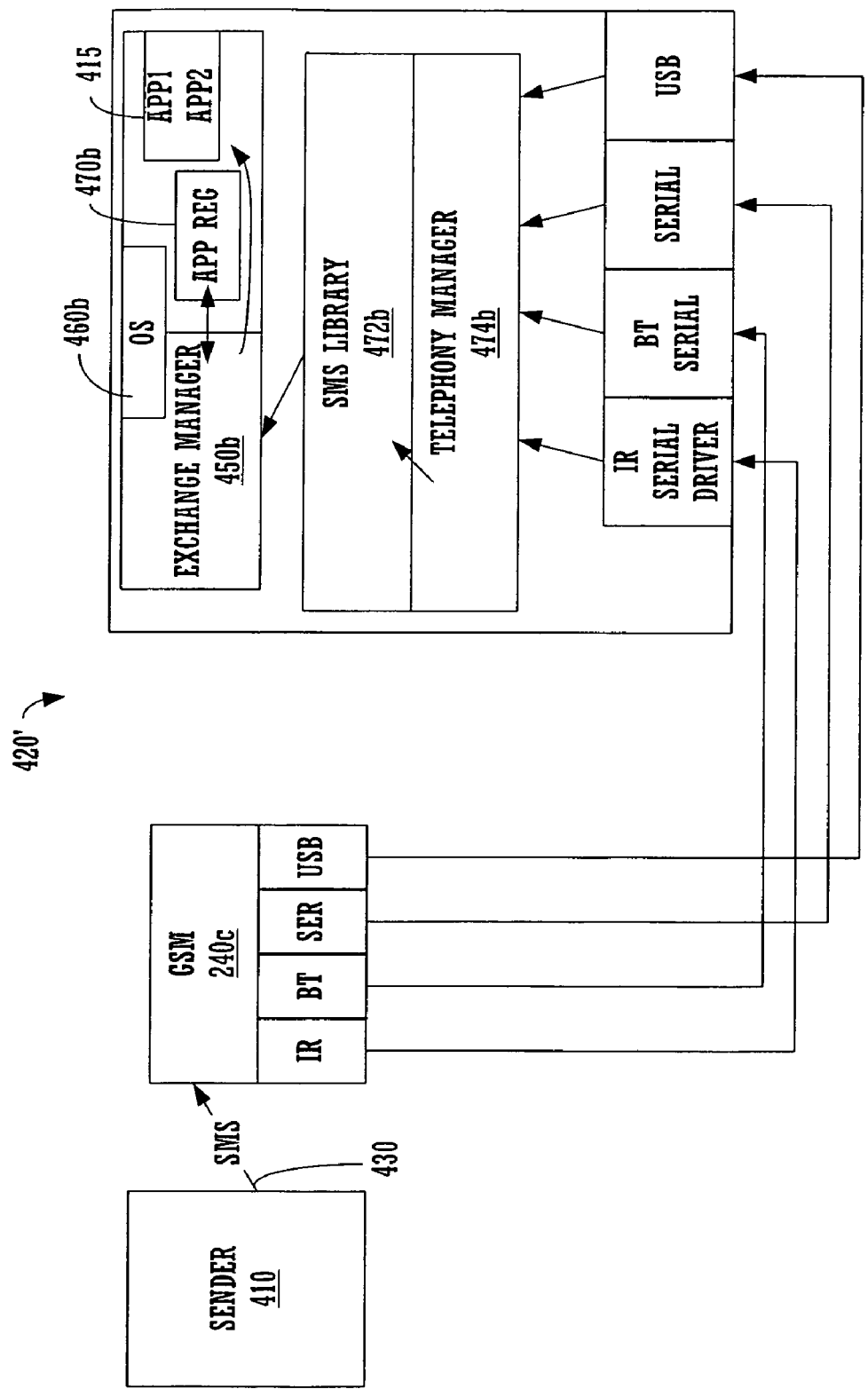
FIG. 8B illustrates components of one embodiment of the present invention situated at the receiving computer system having an external but connected wireless device.
Figure 9:
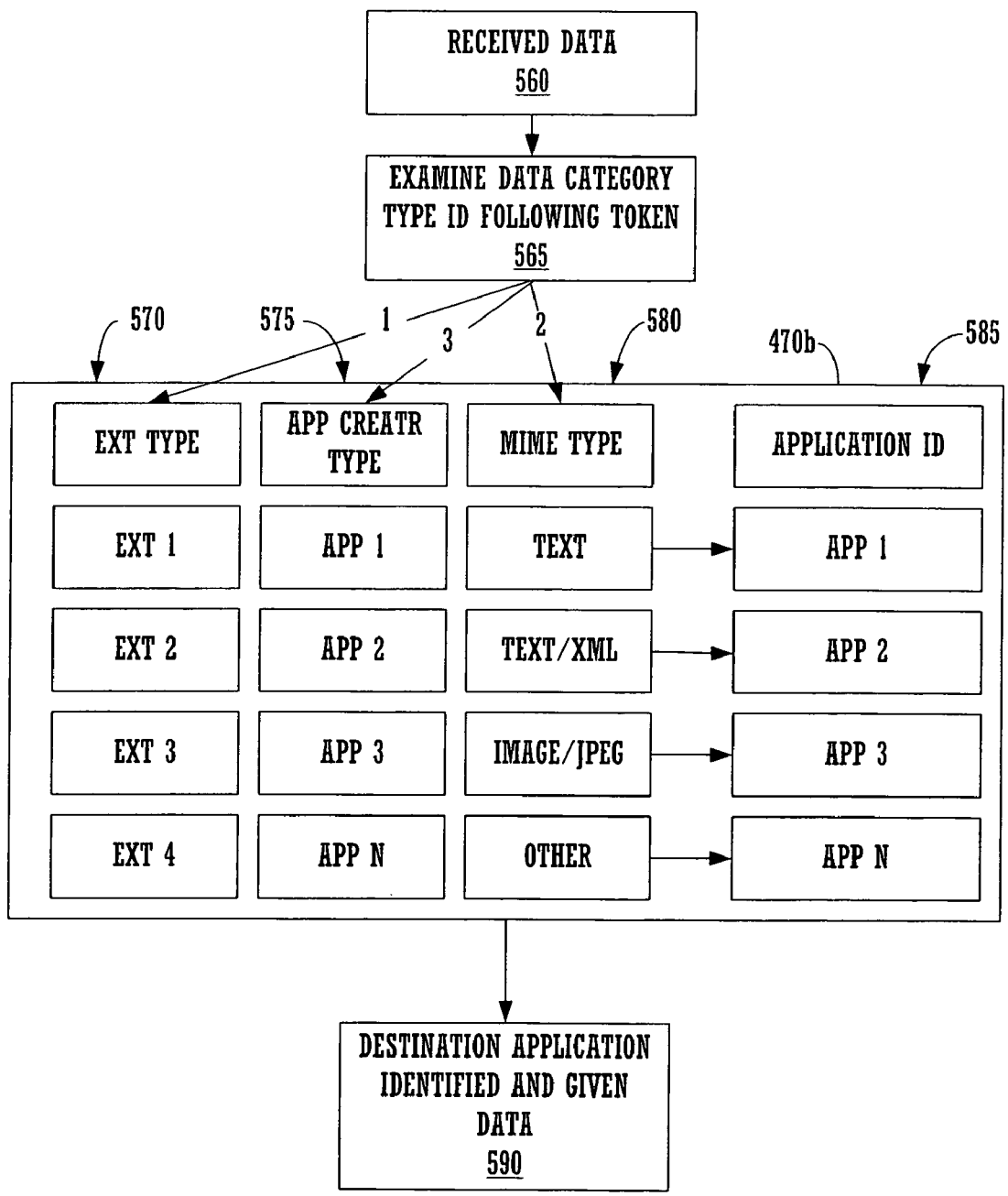
FIG. 9 illustrates the use of the application registry and protocol tags to determine a destination application at the receiving computer system in accordance with an embodiment of the communication protocol of the present invention.
Figure 10:
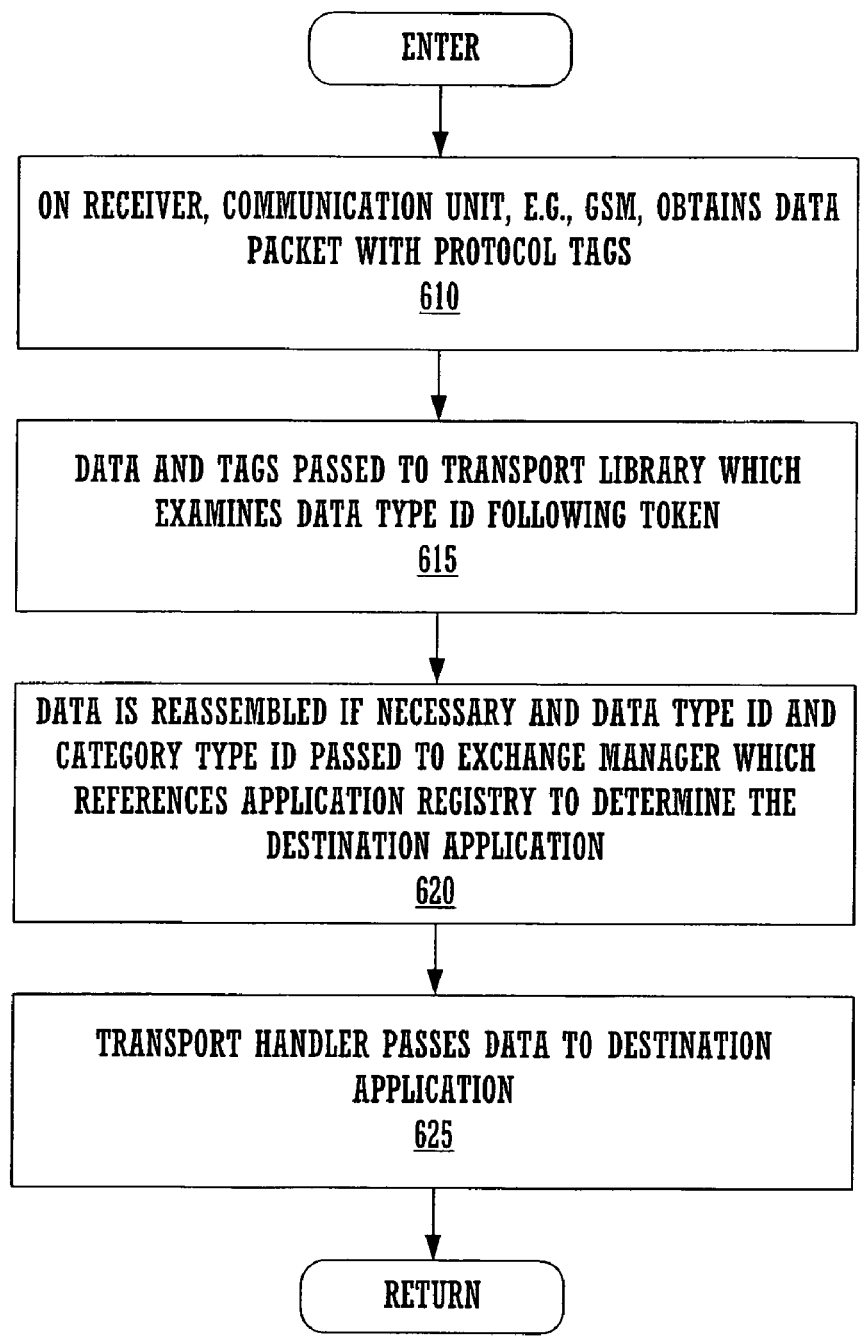
FIG. 10 is a flow diagram indicating steps performed according to an embodiment of the communication protocol of the present invention at the receiving computer system.

Receiver Side. FIG. 8A and FIG. 9 illustrate components that are used in the receiving phase of the communication protocol of the present invention and FIG. 10 is a flow diagram of steps implemented in the receiving phase of the communication protocol. FIG. 8B illustrates an embodiment where the receiving computer system includes an external wireless communication device, e.g., a mobile phone.

The receiver computer system 420 contains a transport handler utility program, e.g., an exchange manager 450b. The receiver computer system 420 also contains receivers for several different transport mechanisms, e.g., GSM 240b, IR 355b and BT 360b. A number of application programs 415 are resident on the receiver 420 and also an application registry 470b is resident in the receiver 420.

As shown in FIG. 9, the application registry 470b contains a mapping of data type identifiers to the applications that are registered for that data type. Also, the data type identifiers are organized by category. The first column 570 represents the "Extensions" category. The second column 575 represents the "Application Creator" category and the third column 580 represents the "Mime Type" category. The fourth column 585 represents the application name that corresponds to a particular data type identifier of a particular category. One application may be associated with more than category. The use of the application registry is described further below.

FIG. 10 illustrates a flow diagram of the receiving end of the communication protocol of the present invention. Process 600 is implemented as computer code stored in memory and executed over a processor. At step 610, the receiver, e.g., the GSM, obtains the information packet including the protocol tags. At step 615, the information packet is passed from the telephony manager to the transport library of the receiving computer which examines the data type identifier and the data category identifier which follow the token, (e.g., "//EXG"), in the received information packet. At step 620, the data is reassembled, if necessary, and the data type identifier and the data category identifier are passed to the exchange manager 450b which references the application registry to determine which application of applications 415 is the proper recipient for the data. This is also shown in FIG. 8B.

FIG. 9 illustrates the manner in which this determination is made. At block 565, the exchange manager examines the category type identifier that follows the token, e.g., "1," "2," or "3."

The category type identifier determines which data column will be used of the application registry to locate the recipient application. If "1" is found, then column 570 is used for the "Extensions category." If "3" is found, then column 575 is used for the "Application Creator category." If "2" is found, then column 580 is used for the "Mime Type category." Once the proper column is selected, then the exchange manager examines the data type identifiers of that column to find a match with the data type identifier located in the information packet. When a match is found, the corresponding entry of column 585 is then examined to determine the recipient application. For instance, if the category was Mime Type and the data identifier of the information packet was "IMAGE/JPEG," then application "APP 3" would be selected by the exchange manager.

Lastly, at step 625 of FIG. 10, the exchange manager 450b then passes the information data packet to the proper recipient application for processing. Using this protocol, the sending application can effectively and efficiently send data wirelessly to a recipient application of a second computer system without any knowledge as to the communication mechanism used.

FIG. 8B is analogous to FIG. 8A, except the receiving computer system 420' includes an externally coupled cell or mobile phone 240c. Also illustrated are the transport library 472b and the telephony manager 474b. The mobile phone 240c can be communicatively coupled to the portable computer via a number of different wired or wireless communication channels, including, for instance, BT, IR, USB or serial as shown. Mobile device 240c then performs the wireless communication 430. It is appreciated that the process of FIG. 10 equally applies to system 420' of FIG. 8B.

The communication protocol of the present invention affords a very little data consuming computer-to-computer communication protocol that allows the exchange of a little amount of data on a narrow bandwidth wireless network For example, with this protocol the user has the opportunity to exchange Memos of a hand-held computer using GSM SMS as a transport. Furthermore, the exchange encoding protocol of the present invention offers hand-held developers an opportunity to write wireless data exchanging applications. It is a protocol advantageous for hand-held device communication in that embodiments are simple, convenient, require less data and are flexible. It is transport independent and compliant with current smart messaging devices.

The preferred embodiment of the present invention, a protocol for wireless data exchange via a packet transport based system, is thus described. While the present invention has been described in particular embodiments, it should be appreciated that the present invention should not be construed as limited by such embodiments, but rather construed according to the below claims.

What is claimed is:

1. A method comprising:
    passing data having a first data type by a sending application resident on a first computer system to a first transport handler program resident on said first computer system;
    adding to said data, by said first transport handler program, a token, a first category type identifier corresponding to said first data type, and a first data type identifier corresponding to said first data type, to form an information packet including said token, said first category type identifier, said first data type identifier, and said data;
    using, by said first transport handler program, a transport mechanism to transmit said information packet to a second computer system;
    using, by a second transport handler program resident on said second computer system, said token to locate said first data type identifier and said first category type identifier in said information packet;
    indexing, by said second transport handler program, a relevant one of a plurality of category types of an application registry with said first data type identifier to determine a destination application that is associated with said first data type identifier; and
    supplying said packet to said destination application.

2. The method of claim 1 wherein said first computer system and said second computer system are portable computer systems.

3. The method of claim 1 wherein said first computer system and said second computer system are hand-held portable computer systems.

4. The method of claim 1 wherein said transport mechanism is compliant with a Short Messaging Service (SMS) standard.

5. The method of claim 1 wherein said transport mechanism includes use of a GSM wireless communication device.

6. The method of claim 1 wherein said plurality of category types comprise: an Extension category, a MIME type category and an Application Creator category.

7. The method of claim 6 wherein said first category type identifier is a numeric value.

8. The method of claim 1, wherein said transport mechanism is a wireless transport mechanism.

9. The method of claim 8 wherein said first portable computer system and said second portable computer system are hand-held portable computer systems.

10. The method of claim 8 wherein said wireless transport mechanism is compliant with the Short Messaging Service (SMS) standard.

11. The method of claim 10 wherein said wireless transport mechanism includes use of a GSM wireless communication device.

12. The method of claim 8 wherein each of a plurality of category type identifiers is a unique numeric value.

13. A machine-readable medium comprising instructions for a processor, such that when the instructions are loaded into a memory and executed by the processor, the processor performs a method, the machine-readable medium comprising:

instructions for a sending application, the instructions for the sending application comprising instructions for passing data having a first data type to a first transport handler program resident on a same processing device as the sending application;

instructions for the first transport handler program, the instructions for the first transport handler program comprising:

instructions for adding to the data passed by the sending application a token, a first category type identifier corresponding to the first data type, and a first data type identifier corresponding to the first data type, to thereby form an information packet including the data, the token, the first category type identifier, and the first data type identifier, and, instructions for using a transport mechanism to transmit the information packet to a second processing device;

instructions for a second transport handler program, the instructions for the second transport handler program comprising:

instructions for locating a second data type identifier and a second category type identifier in a received information packet from a third processing device based on first locating a second token in the received information packet, and instructions for indexing a relevant one of a plurality of category types of a registry with the second data type identifier to determine a destination application associated with the second data type identifier; and instructions for supplying data included in the received information packet to the destination application.

14. A communication system comprising:

a first processing system comprising a first processor, a first memory, and a first bus connecting the first processor and the first memory; and a second processing system comprising a second processor, a second memory, and a second bus connecting the second processor and the second memory, wherein:

the first memory comprises a sending application and a first transport handler program, the second memory comprises an application registry and a second transport handler program, the sending application passes data having a first data type to the first transport handler program, the first transport handler program receives the data from the sending application and adds, thereto, a token, a first category type identifier corresponding to the first data type, and a first data type identifier corresponding to the first data type, thereby forming an information packet, the first transport handler program further sends the information packet to the second processing system, the application registry comprises a mapping of each of a plurality of data type identifiers to one of a plurality of applications of the second processing system registered for each of a plurality of data types, the plurality of data types being organized by a plurality of category types, and the second transport handler program uses the token to locate the first data type identifier and the first category type identifier in the information packet sent by the first transport handler program of the first processing system and to index a relevant one of a plurality of category types of the application registry with the first data type identifier to determine a destination application of the plurality of applications associated with the first data type identifier.

15. The communication system of claim 14, wherein the first processing system and the second processing system are portable processing systems.

16. The communication system of claim 14, wherein the first processing system and a second processing system are hand-held portable computer systems.

17. The communication system of claim 14, wherein the first processing system and the second processing system communicate via a transport mechanism that is compliant with a Short Messaging Service (SMS) standard.

18. The communication system of claim 14, wherein the first processing system and the second processing system each communicate via a respective GSM wireless communication device.

19. The communication system of claim 14, wherein the plurality of category types comprise: and Extension category, a MIME type category and an Application Creator category.

* * * * *